United States Patent
Mikami et al.

(10) Patent No.: US 8,865,270 B2
(45) Date of Patent: Oct. 21, 2014

(54) METHOD FOR MANUFACTURING POWER STORAGE DEVICE

(75) Inventors: Mayumi Mikami, Kanagawa (JP); Takuya Miwa, Kanagawa (JP); Kuniharu Nomoto, Kanagawa (JP); Takeshi Osada, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/339,486

(22) Filed: Dec. 29, 2011

(65) Prior Publication Data

US 2012/0177842 A1     Jul. 12, 2012

(30) Foreign Application Priority Data

Jan. 7, 2011  (JP) .................................. 2011-002145

(51) Int. Cl.
| | |
|---|---|
| *B05D 5/00* | (2006.01) |
| *B05D 5/12* | (2006.01) |
| *H01M 4/1397* | (2010.01) |
| *H01M 4/36* | (2006.01) |
| *H01M 4/58* | (2010.01) |

(52) U.S. Cl.
CPC ............ *H01M 4/1397* (2013.01); *Y02E 60/122* (2013.01); *Y02T 10/7011* (2013.01); *H01M 4/36* (2013.01); *H01M 4/58* (2013.01)
USPC .......... 427/550; 427/532; 427/547; 29/623.1; 29/623.5

(58) Field of Classification Search
None
See application file for complete search history.

(56) References Cited

U.S. PATENT DOCUMENTS

| | | | |
|---|---|---|---|
| 7,390,472 B1 * | 6/2008 | Singhal et al. ................ 423/306 |
| 7,718,314 B2 | 5/2010 | Komiyama et al. | |
| 2004/0096743 A1 | 5/2004 | Okae et al. | |
| 2005/0019656 A1 * | 1/2005 | Yoon et al. ..................... 429/217 |
| 2006/0222952 A1 * | 10/2006 | Kono et al. .............. 429/231.95 |
| 2007/0276217 A1 * | 11/2007 | Brown et al. ................. 600/407 |
| 2008/0248382 A1 | 10/2008 | Sastry et al. | |

(Continued)

FOREIGN PATENT DOCUMENTS

| | | |
|---|---|---|
| JP | 11-025983 | 1/1999 |
| JP | 2004-079276 | 3/2004 |

(Continued)

OTHER PUBLICATIONS

Liang et al., "Anisotropy in magnetic properties and electronic structure of single-crystal LiFePO$_4$", *Physical Review B*, 2008, vol. 77, pp. 064414-1-064414-12.

(Continued)

*Primary Examiner* — Ula C Ruddock
*Assistant Examiner* — Matthew Van Oudenaren
(74) *Attorney, Agent, or Firm* — Nixon Peabody LLP; Jeffrey L. Costellia

(57) ABSTRACT

The power extraction efficiency of a nonaqueous electrolyte secondary battery such as a lithium ion battery is improved. A material having magnetic susceptibility anisotropy such as an olivine type oxide including a transition metal element is used for active material particles. The active material particles and an electrolyte solution are mixed to form a slurry. The slurry is applied to a current collector, and then the current collector is left in a magnetic field. Thus, the active material particles are oriented. With the use of active material particles oriented in such a manner, the power extraction efficiency can be improved.

24 Claims, 7 Drawing Sheets

(56) References Cited

U.S. PATENT DOCUMENTS

| | | |
|---|---|---|
| 2008/0268339 A1 | 10/2008 | Suzuki |
| 2009/0202915 A1* | 8/2009 | Modeki et al. ............... 429/246 |
| 2010/0163790 A1 | 7/2010 | Ceder et al. |
| 2011/0195310 A1* | 8/2011 | Kawamoto et al. ........ 429/231.3 |
| 2012/0177843 A1 | 7/2012 | Takemura |

FOREIGN PATENT DOCUMENTS

| | | |
|---|---|---|
| JP | 2006-127823 | 5/2006 |
| JP | 2006-252945 | 9/2006 |
| JP | 2007-103339 | 4/2007 |
| WO | WO 2006-027925 A2 | 3/2006 |

OTHER PUBLICATIONS

Zhou et al., "The Li intercalation potential of $LiMPO_4$ and $LiMSiO_4$ olivines with M = Fe, Mn, Co, Ni", *Electrochemistry Communications,* Nov. 1, 2004, vol. 6, No. 11, pp. 1144-1148.

Kang et al., "Battery materials for ultrafast charging and discharging", *Nature,* Mar. 12, 2009, vol. 458, No. 12, pp. 190-193.

\* cited by examiner

Li Ions cannot Leave from Central Particle

Li Ions in Central Particle can Leave only from Plane on Right Side

Li Ions in Central Particle can Leave from Both Planes on Right Side and Left Side FIG. 7
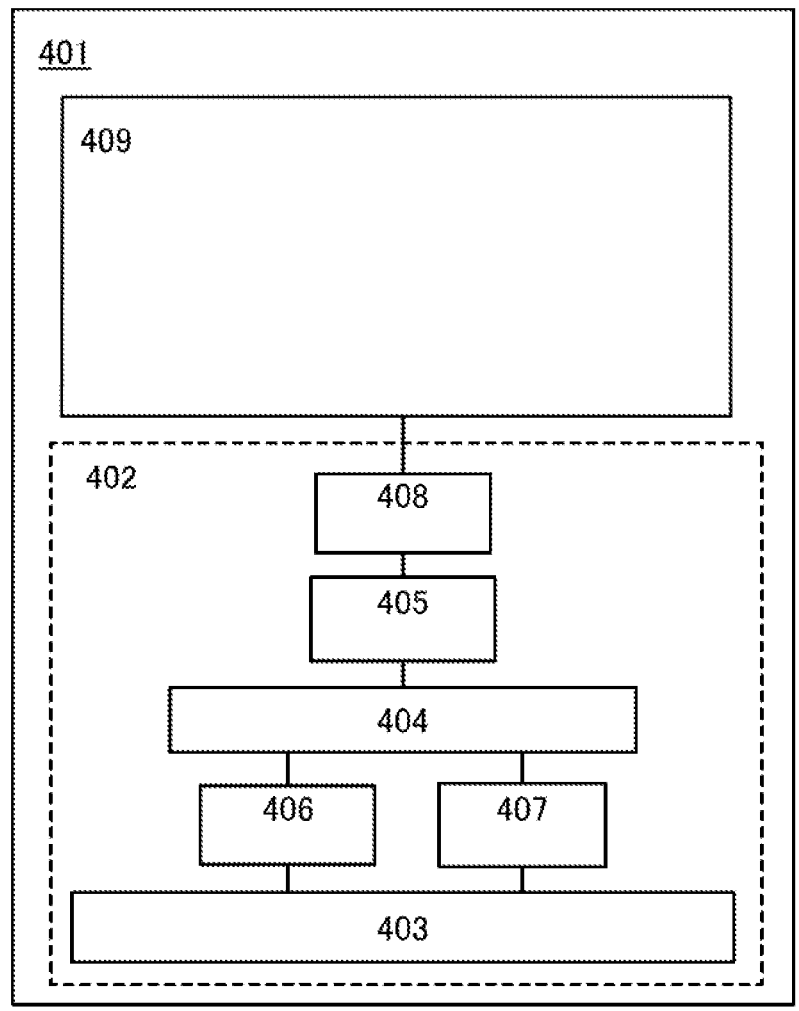
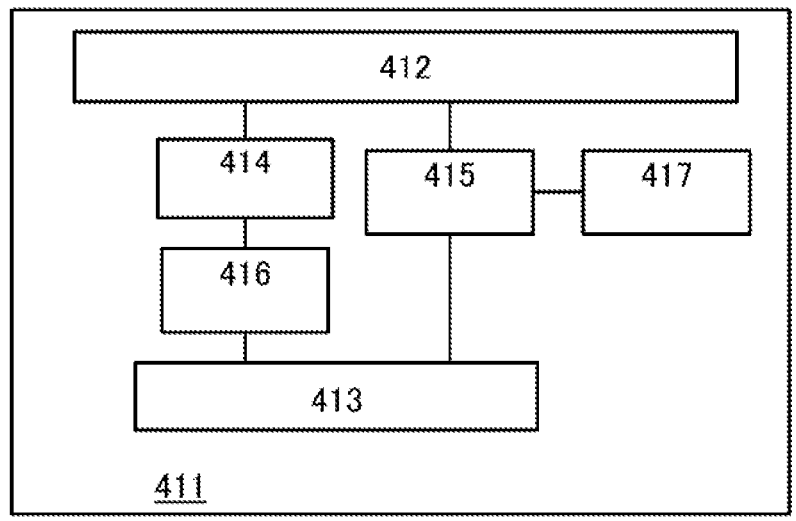

METHOD FOR MANUFACTURING POWER STORAGE DEVICE

BACKGROUND OF THE INVENTION

1. Field of the Invention

The present invention relates to a power storage device including a nonaqueous electrolyte secondary battery, particularly a lithium ion secondary battery (hereinafter simply referred to as a lithium ion battery).

2. Description of the Related Art

As a secondary battery with large storage capacity, a lithium ion battery is mounted not only on a small portable electric appliance but also on an electric vehicle or the like these days. For a positive electrode of a lithium ion battery, lithium cobaltate ($LiCoO_2$) has been conventionally used.

However, since cobalt is a scarce resource, a secondary battery using $LiCoO_2$ or the like as a positive electrode active material is difficult to mass-produce and increase its size for an electric vehicle battery and the battery is inevitably highly expensive. For this reason, as a positive electrode active material, instead of cobalt, attempts have been made to use a lithium-iron composite oxide having an olivine structure and using iron that is an inexpensive abundant resource as its main constituent element (e.g., lithium iron phosphate ($LiFePO_4$)) or a lithium-manganese composite oxide (e.g., lithium manganese phosphate ($LiMnPO_4$)) (see Patent Document 1).

In addition, research on the physical properties of lithium iron phosphate has been carried out and the magnetic properties of a single crystal of lithium iron phosphate have been studied (see Non-Patent Document 1).

REFERENCE

Patent Document

[Patent Document 1] Japanese Published Patent Application No. 2004-079276

Non-Patent Document

[Non-Patent Document 1] G. Liang et al., "Anisotropy in magnetic properties and electric structure of single-crystal $LiFePO_4$", Phys. Rev. B 77 (2008) 064414

SUMMARY OF THE INVENTION

Lithium ion conduction is one-dimensional in a crystal of an olivine type crystalline material, while is two-dimensional in a crystal of lithium cobaltate. Therefore, when lithium ions enter and leave the olivine type crystalline material, the lithium ions are more limited than when they enter and leave lithium cobaltate.

For example, as shown in FIG. 1A, the case is considered where an olivine type active material particle which is a rectangular solid having six planes is used as a positive electrode active material. Lithium ions can move only in directions shown by arrows in the active material particle. For this reason, the number of planes where lithium ions can enter and leave the active material particle is limited to two.

When all the planes face an electrolyte solution, lithium ions can enter and leave freely; however, the proportion of the active material decreases in that case. In order to improve the storage capacity, it is preferable to reduce the amount of the electrolyte solution to increase the proportion of the active material. However, in that case, the planes where lithium ions enter and leave might be covered with the other crystal planes.

For example, when the planes where lithium ions can enter and leave are both covered with planes of the other active material particles where lithium ions cannot enter and leave as shown in FIG. 1B, lithium ions in the central particle cannot be extracted to the outside. The probability of such a case is a little over 44% if the crystal planes are randomly arranged.

Further, in FIG. 1C, one of the planes where lithium ions can enter and leave is covered with a plane of another active material particle where lithium ions cannot enter and leave and the other of the planes is covered with a plane of another active material particle where lithium ions can enter and leave. In that case, only one of the two planes (the plane on the right side in FIG. 1C) can be used to extract lithium ions in the central particle to the outside. In other words, lithium ion conduction is limited. The probability of such a case is also a little over 44% if the crystal planes are randomly arranged.

In the case where both of the planes where lithium ions can enter and leave are covered with planes of the other active material particles where lithium ions can enter and leave as shown in FIG. 1D, there is no limitation when lithium ions in the central particle are extracted. However, the probability of such a case is only a little over 11% if the crystal planes are randomly arranged.

The above consideration is an extreme assumption and in the case where a plane of an active material particle is in contact with the other active material particle, a space is provided therebetween in fact, so that some lithium ions can enter and leave. However, in the case where crystals are densely concentrated, the storage capacity decreases because of the above problems.

When an olivine type active material is used, active material particles are not randomly arranged but crystal planes of the active material particles are aligned in one direction (are oriented); thus, the state shown in FIG. 1D can be surely realized. Magnetic susceptibility anisotropy of an olivine type oxide having a transition metal is utilized in addition to paramagnetism, ferromagnetism, or antiferromagnetism so that the crystal planes are oriented.

In other words, active material particles of the olivine type oxide are formed over a current collector in a magnetic field of 0.01 T to 2 T; thus, the active material particles are oriented. Alternatively, the active material particles are formed over a current collector in a magnetic field of 0.01 T to 0.5 T whose polarity changes at a frequency of 1 Hz to 1000 Hz; thus, the active material particles are oriented. Such an orientation using a magnetic field occurs not only in an olivine type oxide but also in a substance having magnetic susceptibility anisotropy in general. Note that the term "to be oriented" in this specification means that specific orientations of more than or equal to 50% of a plurality of crystals are within 5° from a specific direction.

One embodiment of the present invention is a method for manufacturing a power storage device including the following steps: mixing active material particles having magnetic susceptibility anisotropy and an electrolyte solution to form a slurry, applying the slurry to a current collector, and leaving the current collector to which the slurry is applied in a magnetic field of 0.01 T to 2 T.

One embodiment of the present invention is a method for manufacturing a power storage device including the following steps: mixing active material particles having magnetic susceptibility anisotropy and an electrolyte solution to form a slurry, and applying the slurry to a current collector in a magnetic field of 0.01 T to 2 T.

Further, one embodiment of the present invention is a method for manufacturing a power storage device including the following steps: mixing active material particles having magnetic susceptibility anisotropy and an electrolyte solution to form a slurry, applying the slurry to a current collector, and leaving the current collector to which the slurry is applied in a magnetic field of 0.01 T to 0.5 T whose polarity changes at a frequency of 1 Hz to 1000 Hz.

Furthermore, one embodiment of the present invention is a method for manufacturing a power storage device including the following steps: mixing active material particles having magnetic susceptibility anisotropy and an electrolyte solution to form a slurry, and applying the slurry to a current collector in a magnetic field of 0.01 T to 0.5 T whose polarity changes at a frequency of 1 Hz to 1000 Hz.

In the above methods, a suitable magnetic field to be used is changed depending on the magnetic susceptibility of the active material particles. For example, in the case of ferromagnets, an extremely low magnetic field may be used. On the other hand, in the case of a material having low magnetic susceptibility, a high magnetic field is needed in order to obtain a sufficient orientation.

In the above methods, the size of each active material particle is preferably 5 nm to 200 nm. Alternatively, the average size of each active material particle is preferably 5 nm to 200 nm. Note that in this specification, the size of each active material particle referred to as the cube root of its volume, unless otherwise specified. It is preferable that each active material particle most ideally consist of a single crystal (one crystal).

In practical, it is not necessary for all the active material particles to be single crystals, but it is preferable that more than or equal to 60% of the active material particles be single crystals. As the proportion of single crystals increases, the proportion of particles oriented by a magnetic field increases. Conversely, as the proportion of particles that are not single crystals (i.e., particles each formed of a plurality of crystals having different orientations of crystal planes) increases, the proportion of particles which are oriented decreases because the particles that are not single crystals are difficult to orient by a magnetic field, so that there might be problems in ionic conduction or electronic conduction. In order to obtain single crystal particles, it is preferable to use a solution method such as a hydrothermal method. Further, surfaces of the active material particles may each be coated with carbon.

Note that according to Non-Patent Document 1, the magnetic susceptibility of a (010) direction of lithium iron phosphate is high. In addition, lithium ions move in this direction.

The above description relates to a lithium ion battery; however, without limitation to this, the description can be applied to general nonaqueous electrolyte secondary batteries and further can be applied to general power storage devices. With the above structure, the power extraction efficiency of a power storage device can be improved. This means an improvement of storage capacity and the power storage device is suitable for applications where a large amount of power is needed instantaneously.

For example, a power supply of an electric vehicle consumes a relatively small amount of power when the electric vehicle is driven on flatland. However, a large amount of power is consumed under hard acceleration or in ascending a slope. In that case, the power supply needs to feed a large amount of current; however, when the power extraction efficiency is low, the internal resistance increases, a voltage drop becomes significant, and a loss is caused by the internal resistance.

As a result, part of the power which is expected to be available is lost under such circumstances. For example, when a secondary battery is used as the power supply, although stored power can be almost fully used if the vehicle is driven on flatland, part of the power is lost in ascending a slope or under acceleration. An improvement of the power extraction efficiency can prevent such a loss.

FIGS. 2A to 2C show examples of effects of the present invention. When the present invention is carried out, an active material particle 102 (which may be coated with carbon) dispersed in an electrolyte solution 101 (including a binder or a conductive auxiliary agent) is applied over a current collector 103 as shown in FIG. 2A. The current collector 103 is preferably a paramagnetic substance with low magnetic susceptibility such as aluminum. At this stage, directions of the active material particles are random.

Then, a magnetic field within the above range is applied to the active material particle 102, whereby the active material particle 102 is oriented in a certain direction. Note that when the temperature of the active material particle 102 decreases, the magnetic susceptibility increases, so that the active material particle 102 is easily oriented. Here, the active material particle 102 has anisotropy, in which the magnetic susceptibility of the direction of lithium ion movement is higher than that of the other directions. This case corresponds to lithium iron phosphate. In this case, the direction of lithium ion movement is the same as the direction of the magnetic field.

Consequently, the active material particle 102 is oriented as shown in FIG. 2B. Moreover, the power extraction efficiency can be improved because the active material particles are arranged not to hinder enter and leave of lithium ions. As a result of the orientation treatment, the distance between the active material particles 102 is shortened and an electrolyte solution 105 in an upper layer is not needed, so that the electrolyte solution 105 in the upper layer is preferably removed. As a result, a positive electrode 104 as shown in FIG. 2C can be obtained.

For example, when the active material particle 102 in FIG. 2A is just pressed onto the current collector 103, a positive electrode as shown in FIG. 3A is obtained. In FIG. 3A, planes (where lithium ions enter and leave) of an active material particle on the rightmost side and the third active material particle from the right which are in contact with the current collector 103 face the current collector 103. The other planes (where the lithium ions enter and leave) of the active material particles face planes (where lithium ion movement is hindered) of the other active material particles. Therefore, the lithium ions cannot be extracted from these active material particles.

Magnetic susceptibility anisotropy of an active material particle to be used is not limited to the above. FIG. 3B shows the case where the magnetic susceptibility of a direction vertical to the direction of lithium ion movement is higher than the magnetic susceptibility of the other directions. In that case, the direction of lithium ion movement in an active material particle is orthogonal to the direction of the magnetic field which is applied. In that case, lithium ion movement is not hindered.

Further, the direction of the magnetic field may be parallel to the current collector 103. In that case, the current collector 103 may be placed in a solenoid coil so that the magnetic field is uniform. When the magnetic field is non-uniform, active material particles might concentrate in one part. A superconductive coil is preferably used in order to generate an intense magnetic field in the solenoid coil.

Further, the active material particles may be placed in a magnetic field of 0.01 T to 0.5 T whose polarity changes at a frequency of 1 Hz to 1000 Hz. For example, when an active material particle whose magnetic susceptibility of the direction of lithium ion movement is higher than the magnetic susceptibility of the other directions is used, the direction of lithium ion movement is parallel to a surface of an electrode as shown in FIG. 3C.

Note that a conductive substance placed in a magnetic field whose polarity changes has an effect of shielding the magnetic field by generating current. For example, a magnetic field is shield by the current collector 103 or a carbon film coating the active material particle 102; therefore, the thicknesses of the current collector 103 and the carbon film need to be taken into account.

BRIEF DESCRIPTION OF THE DRAWINGS

FIG. 7 shows a configuration of a wireless power feeding system.

DETAILED DESCRIPTION OF THE INVENTION

Figure 1A:
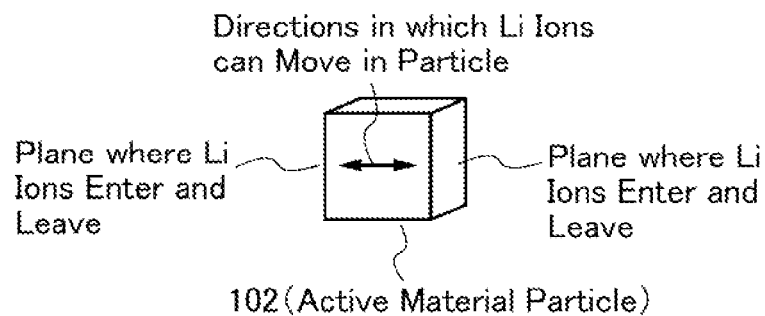
FIGS. 1A to 1D are schematic views of arrangements of an active material particle.
Figure 1B:
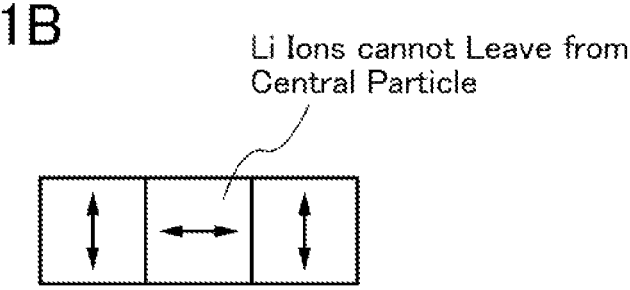
Figure 1C:
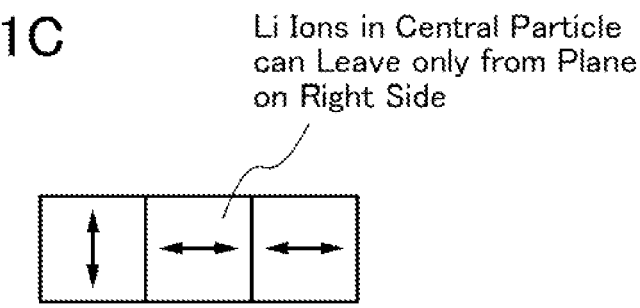
Figure 1D:
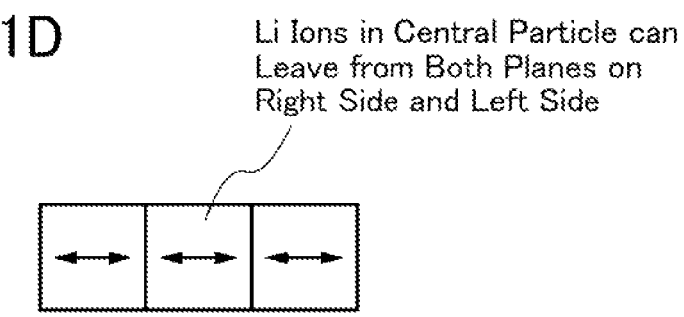
Figure 2A:
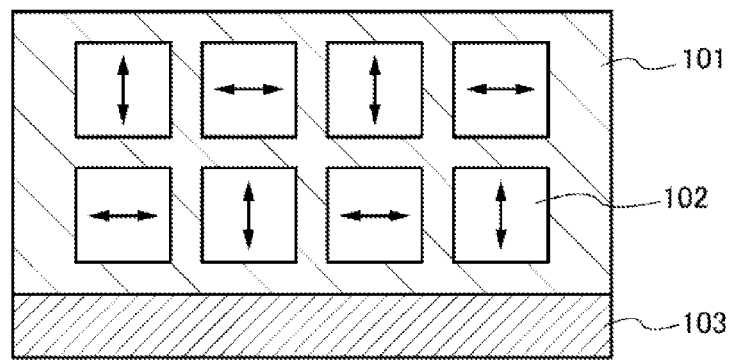
FIGS. 2A to 2C show a method for orienting active material particles.
Figure 2B:
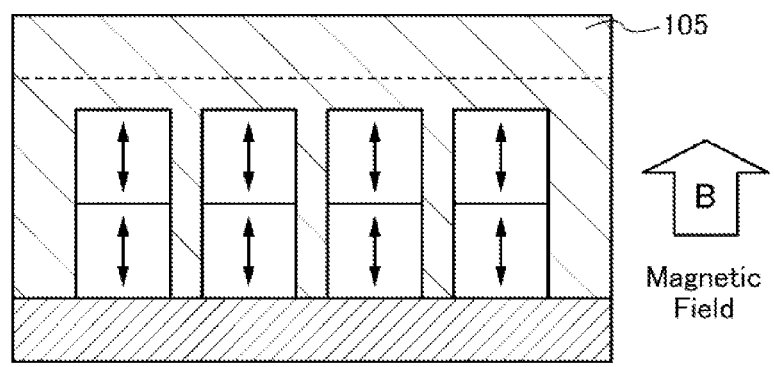
Figure 2C:
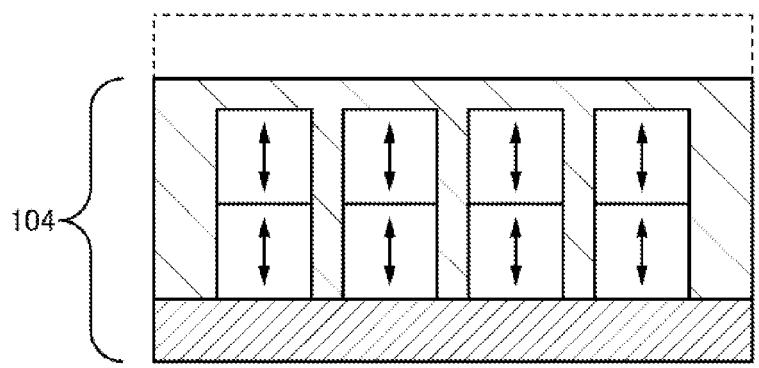
Figure 3A:
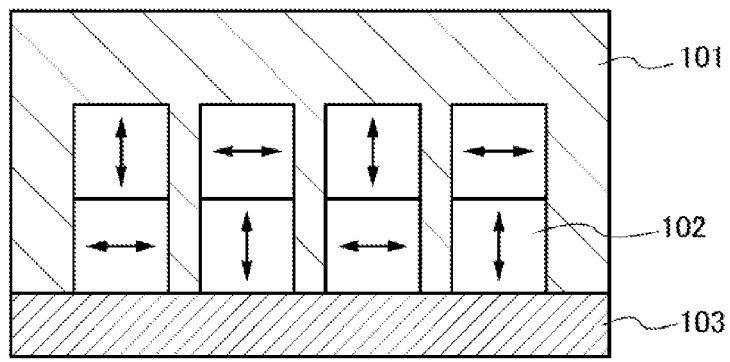
FIGS. 3A to 3C each show an example of an orientation of active material particles.
Figure 3B:
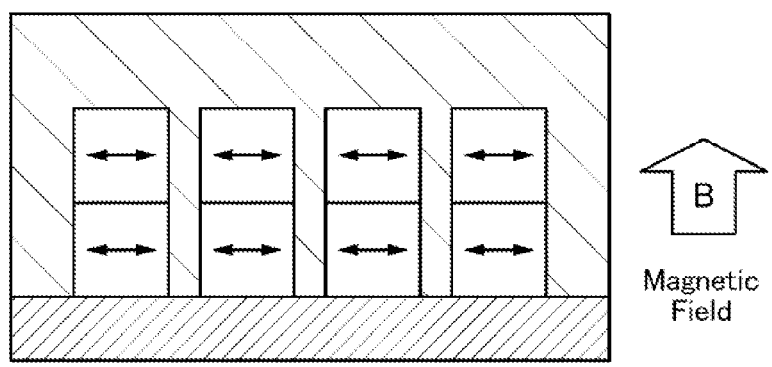
Figure 3C:
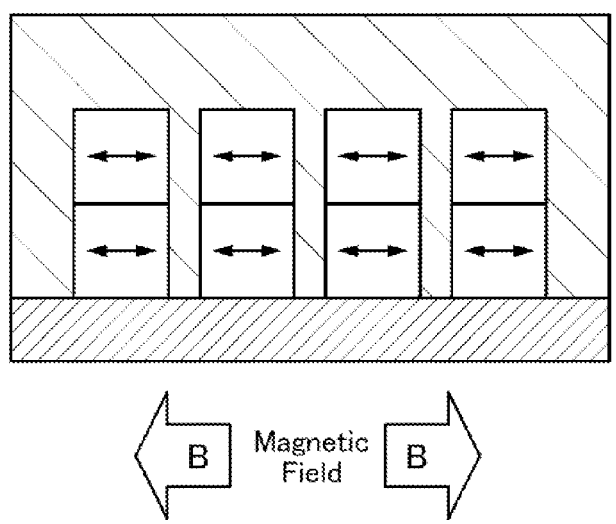

Hereinafter, embodiments will be described with reference to drawings. However, the embodiments can be implemented with various modes. It will be readily appreciated by those skilled in the art that modes and details can be changed in various ways without departing from the spirit and scope of the present invention. Therefore, the present invention should not be interpreted as being limited to the following description of the embodiments.

Embodiment 1

In this embodiment, a method for manufacturing a lithium ion secondary battery that is one embodiment of the present invention will be described. As the material of a positive electrode active material, lithium iron phosphate can be used; however, the present invention is not limited to this. The average size of a particle is preferably 5 nm to 200 nm.

A solution method such as a hydrothermal method may be used for forming positive electrode active material particles other than a solid phase reaction method. When lithium iron phosphate is formed with the use of the hydrothermal method, iron chloride, ammonium phosphate, lithium hydroxide, or hydrate of any of these is preferably used as a starting material, for example.

In particular, the positive electrode active material particles preferably consist of single crystals in order to obtain effects of the present invention sufficiently, and therefore the hydrothermal method is preferably used. Further, a carbohydrate such as glucose may be mixed at the time of baking of the positive electrode active material particles so that the positive electrode active material particles are coated with carbon. This treatment can improve the conductivity. However, carbon coating is unnecessary when the positive electrode active material particles are sufficiently oriented.

The positive electrode active material particles obtained in such a manner, a binder, and an electrolyte solution are mixed to form a slurry. The electrolyte solution in which $LiPF_6$ is dissolved in a mixed solvent of ethylene carbonate (EC) and diethyl carbonate (DEC) is preferably used; however the present invention is not limited hereto.

Then, a positive electrode current collector to which the slurry is applied is left in a magnetic field for 2 seconds to 1 hour. Alternatively, the slurry may be applied to the positive electrode current collector in the magnetic field. The intensity of the magnetic field is 0.01 T to 2 T. For the positive electrode current collector, a metal material containing aluminum as its main component is preferably used. Further, the positive electrode current collector preferably contains a transition metal with high magnetic susceptibility such as iron, nickel, or cobalt and lanthanoid such as ytterbium or dysprosium at a total concentration of lower than or equal to 1 at %.

In order to apply the magnetic field, for example, the north pole or the south pole of a magnet such as a neodymium magnet or a samarium cobalt magnet is preferably brought near a surface of the positive electrode current collector which is opposite to a surface to which the slurry is applied. The positive electrode active material particles are drawn to the positive electrode current collector, so that almost no active material particles are in an upper layer portion of the slurry; therefore, the upper layer portion of the slurry is removed. Then, the slurry is dried. Thus, a positive electrode is completed. With the use of the positive electrode manufactured in such a manner, a lithium ion battery can be manufactured.

Figure 5:
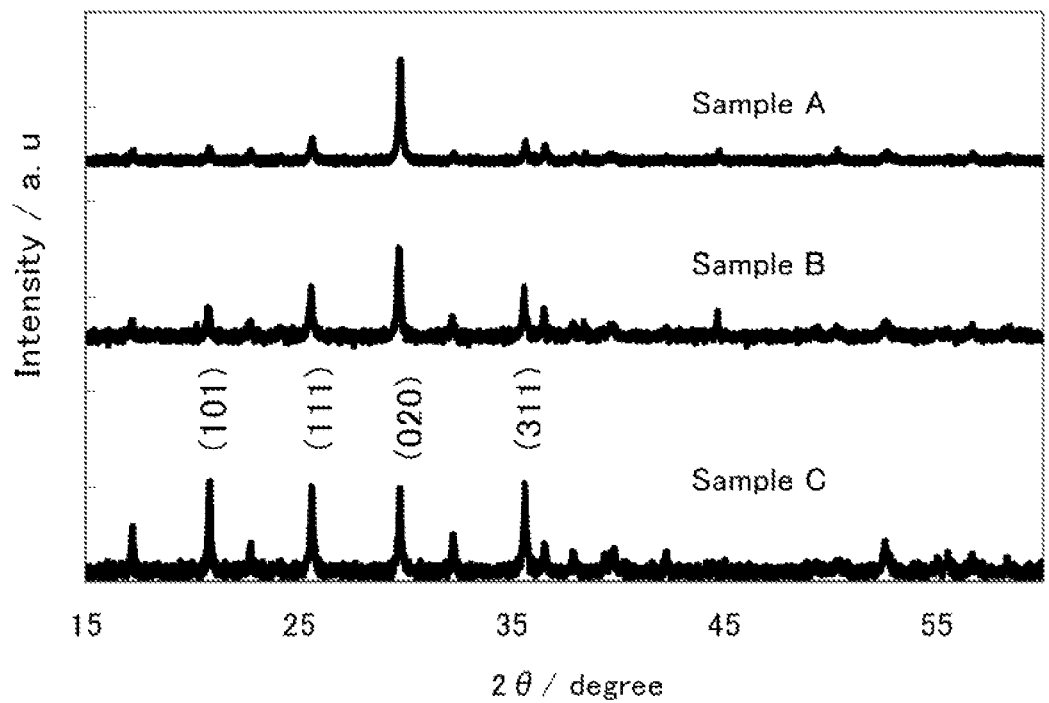
FIG. 5 shows examples of an orientation of active material particles using a magnetic field.

FIG. 5 shows the results of X-ray diffraction (Cu Kα) of the positive electrode active material particles over the positive electrode current collector manufactured according to this embodiment. The diffraction result of a sample C shown in FIG. 5 is the diffraction result of a reference material that is powder of lithium iron phosphate which is not oriented at all. As shown in the graph, the diffraction intensities of a (101) plane, a (111) plane, a (020) plane, and a (311) plane are substantially equal.

The diffraction result of a sample B shown in FIG. 5 is the diffraction result of positive electrode active material particles oriented by using a samarium cobalt magnet. In the diffraction result, the intensity of the peak attributed to the (020) plane is relatively higher than the intensities of the peaks of the other planes compared to the sample C. The diffraction result of a sample A shown in FIG. 5 is the diffraction result of positive electrode active material particles oriented by using a neodymium magnet having a higher magnetic field. In the diffraction result, the intensity of the peak attributed to the (020) plane is further increased and the (010) plane is oriented parallel to the substrate.

Figure 4:
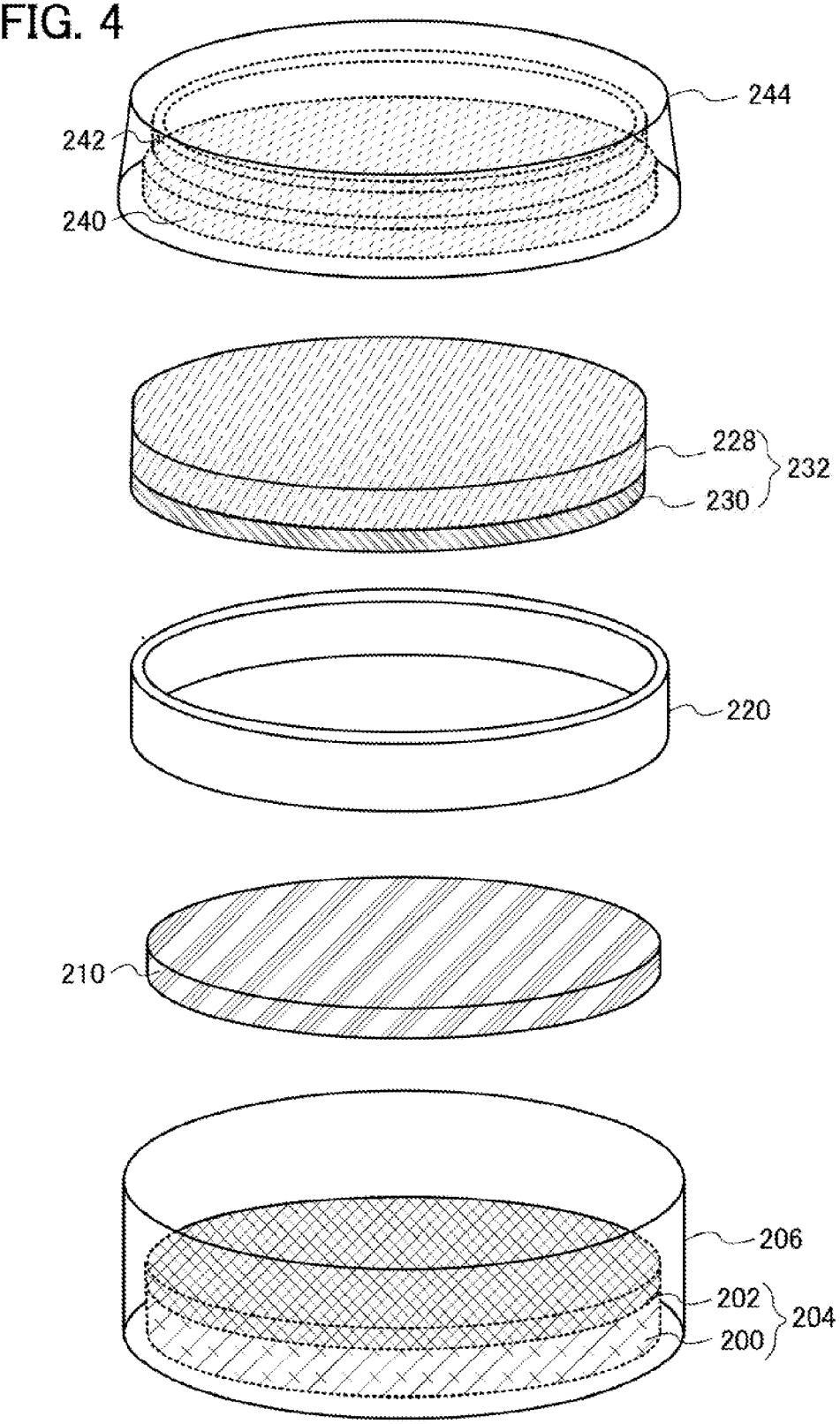
FIG. 4 shows an example of a secondary battery.

A secondary battery using a positive electrode including positive electrode active material particles oriented in such a manner will be described with reference to FIG. 4. FIG. 4 is a schematic view showing the structure of a coin-type secondary battery. A positive electrode 232 includes a positive electrode current collector 228 and a positive electrode active material layer 230 formed through the above method (the positive electrode active material layer 230 including oriented positive electrode active material particles, an electrolyte solution, and a binder).

As shown in FIG. 4, the coin-type secondary battery includes a negative electrode 204, the positive electrode 232, a separator 210, the electrolyte solution (not shown), a housing 206, and a housing 244. In addition, the coin-type secondary battery includes a ring-shaped insulator 220, a spacer 240, and a washer 242. As the positive electrode 232, the electrode that is obtained in the above step by forming the positive electrode active material layer 230 over the positive electrode current collector 228 is used.

The electrolyte solution in which $LiPF_6$ is dissolved in a mixed solvent of ethylene carbonate (EC) and diethyl carbonate (DEC) is preferably used; however the present invention is not limited hereto.

The negative electrode 204 includes a negative electrode active material layer 202 over a negative electrode current collector 200. As the negative electrode current collector 200, copper is used, for example. As the negative electrode active material, graphite, polyacene, or the like is used. The negative electrode active material layer 202 is preferably formed using such a material alone or a mixture of the material and a binder.

An insulator provided with holes (e.g., polypropylene) may be used for the separator 210. Alternatively, a solid electrolyte which can transmit lithium ions may be used.

The housing 206, the housing 244, the spacer 240, and the washer 242 each of which is made of metal (e.g., stainless steel) are preferably used. The housing 206 and the housing 244 each have a function of electrically connecting the negative electrode 204 and the positive electrode 232 to the outside.

The negative electrode 204, the positive electrode 232, and the separator 210 are soaked in the electrolyte. Then, as shown in FIG. 4, the negative electrode 204, the separator 210, the ring-shaped insulator 220, the positive electrode 232, the spacer 240, the washer 242, and the housing 244 are stacked in this order inside the housing 206. The housing 206 and the housing 244 are subjected to pressure bonding. In such a manner, the coin-type secondary battery is manufactured.

Embodiment 2

The power storage device according to one embodiment of the present invention described in Embodiment 1 can be used as a power supply of various electronic appliances and electric appliances which are driven by electric power.

Specific examples of electronic and electric appliances using the power storage device according to one embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, video cameras, digital still cameras, high-frequency heating apparatus such as microwaves, electric rice cookers, electric washing machines, air-conditioning systems such as air conditioners, electric refrigerators, electric freezers, electric refrigerator-freezers, medical equipments such as freezers for preserving DNA and dialysis devices, and the like.

In addition, moving objects driven by an electric motor using electric power from a power storage device are also included in the category of electronic and electric appliances. As examples of the moving objects, electric vehicles, hybrid vehicles including both an internal-combustion engine and an electric motor, motorized bicycles including motor-assisted bicycles, and the like are given.

In the electronic and electric appliances, the power storage device according to one embodiment of the present invention can be used as a power storage device for supplying enough electric power for almost the whole power consumption (such a power storage device is referred to as a main power supply). Alternatively, in the electronic and electric appliances, the power storage device according to one embodiment of the present invention can be used as a power storage device which can supply electric power to the electronic and electric appliances when the supply of power from the main power supply or a commercial power supply is stopped (such a power storage device is referred to as an uninterruptible power supply). Further alternatively, in the electronic and electric appliances, the power storage device according to one embodiment of the present invention can be used as a power storage device for supplying electric power to the electronic and electric appliances at the same time as the electric power supply from the main power supply or a commercial power supply (such a power storage device is referred to as an auxiliary power supply).

Figure 6:
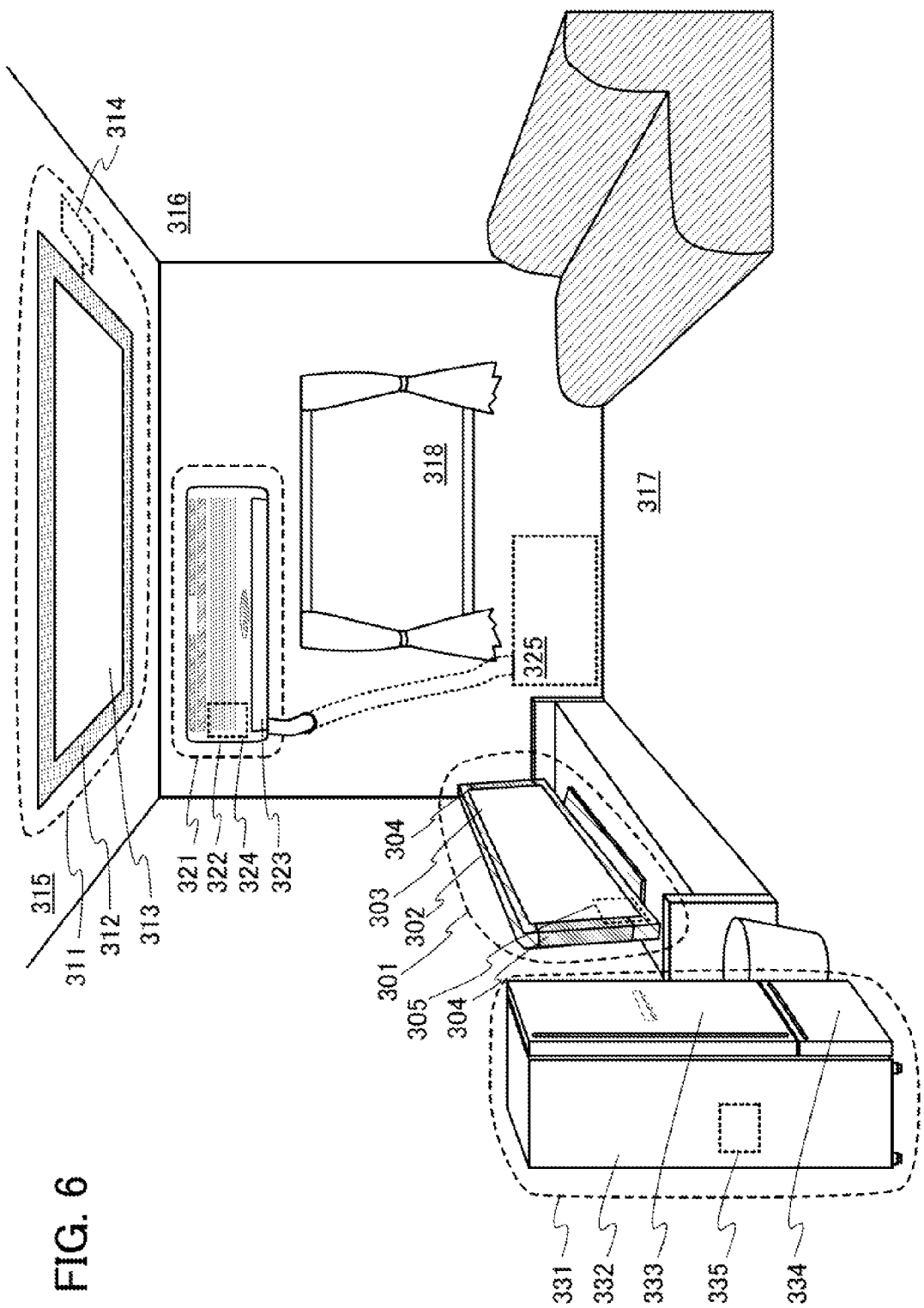
FIG. 6 shows application examples of a power storage device.

FIG. 6 shows specific structures of the electronic and electric appliances. In FIG. 6, a display device 301 is an example of an electronic and electric appliance including a power storage device 305 according to one embodiment of the present invention. Specifically, the display device 301 corresponds to a display device for TV broadcast reception and includes a housing 302, a display portion 303, speaker portions 304, the power storage device 305, and the like. The power storage device 305 according to one embodiment of the present invention is provided inside the housing 302.

The display device 301 can receive electric power from a commercial power supply. Alternatively, the display device 301 can use electric power stored in the power storage device 305. Thus, the display device 301 can be operated with the use of the power storage device 305 according to one embodiment of the present invention as an uninterruptible power supply even when electric power cannot be supplied from the commercial power supply because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 303.

Note that the display device includes, in its category, all of information display devices for personal computers, advertisement displays, and the like other than TV broadcast reception.

In FIG. 6, an installation lighting device 311 is an example of an electric appliance including a power storage device 314 according to one embodiment of the present invention. Specifically, the lighting device 311 includes a housing 312, a light source 313, a power storage device 314, and the like. FIG. 6 shows the case where the power storage device 314 is provided in a ceiling 315 on which the housing 312 and the light source 313 are installed; alternatively, the power storage device 314 may be provided in the housing 312.

The lighting device 311 can receive electric power from the commercial power supply. Alternatively, the lighting device 311 can use electric power stored in the power storage device 314. Thus, the lighting device 311 can be operated with the use of the power storage device 314 according to one embodiment of the present invention as an uninterruptible power supply even when electric power cannot be supplied from the commercial power supply because of power failure or the like.

Note that although the installation lighting device 311 provided in the ceiling 315 is shown in FIG. 6 as an example, the power storage device according to one embodiment of the present invention can be used in an installation lighting device provided in, for example, a wall 316, a floor 317, a window 318, or the like other than the ceiling 315. Alternatively, the power storage device can be used in a tabletop lighting device and the like.

As the light source 313, an artificial light source which obtains light artificially by using electric power can be used. Specifically, a discharge lamp such as an incandescent lamp and a fluorescent lamp, and a light-emitting element such as an LED and an organic EL element are given as examples of the artificial light source.

In FIG. 6, an air conditioner including an indoor unit 321 and an outdoor unit 325 is an example of an electric appliance including a power storage device 324 according to one embodiment of the present invention. Specifically, the indoor unit 321 includes a housing 322, a ventilation duct 323, the power storage device 324, and the like. FIG. 6 shows the case where the power storage device 324 is provided in the indoor unit 321; alternatively, the power storage device 324 may be provided in the outdoor unit 325. Further alternatively, the power storage devices 324 may be provided in both the indoor unit 321 and the outdoor unit 325.

The air conditioner can receive electric power from the commercial power supply. Alternatively, the air conditioner can use electric power stored in the, power storage device 324. Specifically, in the case where the power storage devices 324 are provided in both the indoor unit 321 and the outdoor unit 325, the air conditioner can be operated with the use of the power storage device 324 according to one embodiment of the present invention as an uninterruptible power supply even when electric power cannot be supplied from the commercial power supply because of power failure or the like.

Note that although the separated air conditioner including the indoor unit and the outdoor unit is shown in FIG. 6 as an example, the power storage device according to one embodiment of the present invention can be used in an air conditioner in which the functions of an indoor unit and an outdoor unit are integrated in one housing.

In FIG. 6, an electric refrigerator-freezer 331 is an example of an electric appliance including a power storage device 335 according to one embodiment of the present invention. Specifically, the electric refrigerator-freezer 331 includes a housing 332, a door for a refrigerator 333, a door for a freezer 334, the power storage device 335, and the like. The power storage device 335 is provided in the housing 332 in FIG. 6. The electric refrigerator-freezer 331 can receive electric power from the commercial power supply. Alternatively, the electric refrigerator-freezer 331 can use electric power stored in the power storage device 335. Thus, the electric refrigerator-freezer 331 can be operated with the use of the power storage device 335 according to one embodiment of the present invention as an uninterruptible power supply even when electric power cannot be supplied from the commercial power supply because of power failure or the like.

Note that among the electronic and electric appliances described above, a high-frequency heating apparatus such as a microwave and an electric appliance such as an electric rice cooker require high electric power in a short time. The tripping of a circuit breaker of a commercial power supply in use of electric appliances can be prevented by using the power storage device according to one embodiment of the present invention as an auxiliary power supply for supplying electric power which cannot be supplied enough by a commercial power supply.

In addition, in a time period when electronic and electric appliances are not used, specifically when the proportion of the amount of electric power which is actually used to the total amount of electric power which can be supplied by a commercial power supply source (such a proportion referred to as a usage rate of electric power) is low, electric power can be stored in the power storage device, whereby the usage rate of electric power can be reduced in a time period when the electronic and electric appliances are used. In the case of the electric refrigerator-freezer 331, electric power can be stored in the power storage device 335 at night time when the temperature is low and the door for a refrigerator 333 and the door for a freezer 334 are not opened or closed. The power storage device 335 is used as an auxiliary power supply in daytime when the temperature is high and the door for a refrigerator 333 and the door for a freezer 334 are opened and closed; thus, the usage rate of electric power in daytime can be reduced.

Embodiment 3

In this embodiment, an example of the case where the secondary battery according to one embodiment of the present invention described in Embodiment 1 is used as a wireless power feeding system (hereinafter referred to as an RF power feeding system) will be described with reference to a block diagram shown in FIG. 7. In FIG. 7, elements in a power receiving device and a power feeding device are classified depending on their functions and included in different blocks. However, it may be practically difficult to classify the elements completely, depending on their functions, and one element may involve a plurality of functions.

First, the RF power feeding system is roughly described. A power receiving device 401 is included in an electronic appliance, an electric propulsion vehicle, or the like which is driven by electric power supplied from a power feeding device 411, and can be applied to another device which is driven by electric power, as appropriate.

Typical examples of the electronic appliance include cameras such as digital cameras or video cameras, digital photo frames, mobile phones (also referred to as cellular phones or cellular phone devices), portable game machines, portable information terminals, audio reproducing devices, display devices, computers.

Typical examples of the electric propulsion vehicles include electric vehicles, hybrid electric vehicles, train vehicles, maintenance vehicles, carts, wheelchairs, and the like. In addition, the power feeding device 411 has a function of supplying electric power to the power receiving device 401.

In FIG. 7, the power receiving device 401 includes the power receiving device portion 402 and the power load portion 409. The power receiving device portion 402 includes at least a power receiving device antenna circuit 403, a signal processing circuit 404, and a secondary battery 405. The power feeding device 411 includes at least a power feeding device antenna circuit 412 and a signal processing circuit 413.

The power receiving device antenna circuit 403 has a function of receiving a signal transmitted by the power feeding device antenna circuit 412 or transmitting, a signal to the power feeding device antenna circuit 412. The signal processing circuit 404 has a function of processing a signal received by the power receiving device antenna circuit 403 and controlling charge of the secondary battery 405 and supply of electric power from the secondary battery 405 to the power load portion 409. In addition, the signal processing circuit 404 controls operation Of the power receiving device antenna circuit 403. That is, the signal processing circuit 404 can control the intensity, the frequency, or the like of a signal transmitted by the power receiving device antenna circuit 403.

The power load portion 409 is a driver portion which receives electric power from the secondary battery 405 and drives the power receiving device 401. Typical examples of the power load portion 409 include a motor and a driving circuit. Another device which drives the power receiving device by receiving electric power can be used as the power load portion 409 as appropriate. The power feeding device antenna circuit 412 has a function of transmitting a signal to the power receiving device antenna circuit 403 or receiving a signal from the power receiving device antenna circuit 403.

The signal processing circuit 413 has a function of processing a signal received by the power feeding device antenna circuit 412. In addition, the signal processing circuit 413 controls operation of the power feeding device antenna circuit 412. That is, the signal processing circuit 413 can control the intensity, the frequency, or the like of a signal transmitted by the power feeding device antenna circuit 412.

The secondary battery according to one embodiment of the present invention is used as the secondary battery 405 included in the power receiving device 401 in the RF power feeding system shown in FIG. 7. With the use of the secondary battery according to one embodiment of the present invention in the RF power feeding system, the amount of power storage can be larger than that in a conventional secondary battery. Consequently, the time interval of the wireless power feeding can be lengthened (frequent power feeding, can be omitted).

In addition, with the use of the secondary battery according to one embodiment of the present invention in the RF power feeding system, the power receiving device 401 can be formed to be compact and lightweight if the amount of power storage with which the power load portion 409 can be driven is the same as that in a conventional power storage device. Therefore, the total cost can be reduced.

The power receiving device 401 includes the power receiving device portion 402 and the power load portion 409. The power receiving device portion 402 includes at least the power receiving device antenna circuit 403, the signal processing circuit 404, the secondary battery 405, a rectifier circuit 406, a modulation circuit 407, and a power supply circuit 408. In addition, the power feeding device 411 includes at least the power feeding device antenna circuit 412, the signal processing circuit 413, a rectifier circuit 414, a modulation circuit 415, a demodulation circuit 416, and an oscillator circuit 417.

The power receiving device antenna circuit 403 has a function of receiving a signal transmitted by the power feeding device antenna circuit 412 or transmitting a signal to the power feeding device antenna circuit 412. In the case where the power receiving device antenna circuit 403 receives a signal transmitted from the power feeding device antenna circuit 412, the rectifier circuit 406 has a function of generating DC voltage from the signal received by the power receiving device antenna circuit 403.

The signal processing circuit 404 has a function of processing a signal received by the power receiving device antenna circuit 403 and controlling charge of the secondary battery 405 and supply of electric power from the secondary battery 405 to the power supply circuit 408. The power supply circuit 408 has a function of converting voltage stored by the secondary battery 405 into voltage needed for the power load portion 409. The modulation circuit 407 is used when a response signal is transmitted from the power receiving device 401 to the power feeding device 411.

With the power supply circuit 408, electric power supplied to the power load portion 409 can be controlled. Thus, overvoltage application to the power load portion 409 can be suppressed, and deterioration or breakdown of the power receiving device 401 can be reduced.

In addition, with the modulation circuit 407, a signal can be transmitted from the power receiving device 401 to the power feeding device 411. Therefore, when the amount of charged power in the power receiving device 401 is judged and a certain amount of power is charged, a signal is transmitted from the power receiving device 401 to the power feeding device 411 so that power feeding from the power feeding device 411 to the power receiving device 401 can be stopped. As a result, the secondary battery 405 is not fully charged, so that the number of times the secondary battery 405 is charged can be increased.

The power feeding device antenna circuit 412 has a function of transmitting a signal to the power receiving device antenna circuit 403 or receiving a signal from the power receiving device antenna circuit 403. When a signal is transmitted to the power receiving device antenna circuit 403, the signal processing circuit 413 generates a signal which is transmitted to the power receiving device 401. The oscillator circuit 417 generates a signal with a constant frequency. The modulation circuit 415 has a function of applying a voltage to the power feeding device antenna circuit 412 depending on the signal generated by the signal processing circuit 413 and the signal with a constant frequency generated by the oscillator circuit 417.

Thus, a signal is output from the power feeding device antenna circuit 412. On the other hand, when a signal is received from the power receiving device antenna circuit 403, the rectifier circuit 414 has a function of rectifying the received signal. From signals rectified by the rectifier circuit 414, the demodulation circuit 416 extracts a signal transmitted from the power receiving device 401 to the power feeding device 411. The signal processing circuit 413 has a function of analyzing the signal extracted by the demodulation circuit 416.

Note that any circuit may be provided between circuits as long as the RF power feeding can be performed. For example, after the power receiving device 401 receives a signal and the rectifier circuit 406 generates a DC voltage, a circuit such as a DC-DC converter or a regulator that is provided in a subsequent stage may generate a constant voltage. Thus, overvoltage application to the inside of the power receiving device 401 can be suppressed.

Note that when the secondary battery according to one embodiment of the present invention is used in the RF power feeding system and the power receiving device antenna circuit 403 and the secondary battery 405 are overlapped with each other, it is preferable that the impedance of the power receiving device antenna circuit 403 is not changed by deformation of the secondary battery 405 due to charge and discharge of the secondary battery 405 and deformation of an antenna due to the above deformation. This is because when the impedance of the antenna is changed, electric power might not be supplied sufficiently.

For example, the secondary battery 405 may be placed in a battery pack formed using metal or ceramics. Note that in that case, the power receiving device antenna circuit 403 and the battery pack are preferably separated from each other by several tens of micrometers or more.

The signal for charging has no limitation on its frequency and may have any band of frequency as long as electric power can be transmitted. For example, the signal for charging may have any of an LF band of 135 kHz (long wave), an HF band of 13.56 MHz, a UHF band of 900 MHz to 1 GHz, and a microwave band of 2.45 GHz.

A signal transmission method may be appropriately selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or a very-long wave of 3 kHz to 30 kHz is preferably used.

This embodiment can be combined with any other embodiment.

This application is based on Japanese Patent Application serial No. 2011-002145 filed with Japan Patent Office on Jan. 7, 2011, the entire contents of which are hereby incorporated by reference.

What is claimed is:

1. A method for manufacturing a power storage device, comprising the steps of:
mixing active material particles having magnetic susceptibility anisotropy and one of a binder and an electrolyte solution to form a slurry;
applying the slurry to a current collector;
leaving the current collector to which the slurry is applied in a magnetic field of 0.01 T to 2 T to separate the slurry into a first portion that does not substantially include the active material particles and a second portion that contains most of the active material particles, wherein the second portion is located between the current collector and the first portion; and
selectively removing the first portion wherein most parts of the first portion are removed without drying.

2. The method for manufacturing a power storage device, according to claim 1, wherein the active material particles comprises iron and phosphorus and has an olivine structure, and an average of a cube root of a volume of each of the active material particles is 5 nm to 200 nm.

3. The method for manufacturing a power storage device, according to claim 1, wherein a surface of one of the active material particles is coated with carbon.

4. The method for manufacturing a power storage device, according to claim 2, wherein more than or equal to 60% of the active material particles are single crystals.

5. The method for manufacturing a power storage device, according to claim 2, wherein the average of is 5 nm to 50 nm.

6. A method for manufacturing a power storage device, comprising the steps of:
mixing active material particles having magnetic susceptibility anisotropy and one of a binder and an electrolyte solution to form a slurry;
applying the slurry to a current collector in a magnetic field of 0.01 T to 2 T to separate the slurry into a first portion that does not substantially include the active material particles and a second portion that contains most of the active material particles, wherein the second portion is located between the current collector and the first portion; and
selectively removing the first portion wherein most parts of the first portion are removed without drying.

7. The method for manufacturing a power storage device, according to claim 6, wherein the active material particles comprises iron and phosphorus and has an olivine structure, and an average of a cube root of a volume of each of the active material particles is 5 nm to 200 nm.

8. The method for manufacturing a power storage device, according to claim 6, wherein a surface of one of the active material particles is coated with carbon.

9. The method for manufacturing a power storage device, according to claim 8, wherein more than or equal to 60% of the active material particles are single crystals.

10. The method for manufacturing a power storage device, according to claim 7, wherein the average is 5 nm to 50 nm.

11. A method for manufacturing a power storage device, comprising the steps of:
mixing active material particles having magnetic susceptibility anisotropy and one of a binder and an electrolyte solution to form a slurry;
applying the slurry to a current collector;
leaving the current collector to which the slurry is applied in a magnetic field of 0.01 T to 0.5 T whose polarity changes at a frequency of 1 Hz to 1000 Hz to separate the slurry into a first portion that does not substantially include the active material particles and a second portion that contains most of the active material particles, wherein the second portion is located between the current collector and the first portion; and
selectively removing the first portion wherein most parts of the first portion are removed without drying.

12. The method for manufacturing a power storage device, according to claim 11, wherein the active material particles comprises iron and phosphorus and has an olivine structure, and an average of a cube root of a volume of each of the active material particles is 5 nm to 200 nm.

13. The method for manufacturing a power storage device, according to claim 11, wherein a surface of one of the active material particles is coated with carbon.

14. The method for manufacturing a power storage device, according to claim 12, wherein more than or equal to 60% of the active material particles are single crystals.

15. The method for manufacturing a power storage device, according to claim 12, wherein the average is 5 nm to 50 nm.

16. A method for manufacturing a power storage device, comprising the steps of:
mixing active material particles having magnetic susceptibility anisotropy and one of a binder and an electrolyte solution to form a slurry;
applying the slurry to a current collector in a magnetic field of 0.01 T to 0.5 T whose polarity changes at a frequency of 1 Hz to 1000 Hz to separate the slurry into a first portion that does not substantially include the active material particles and a second portion that contains most of the active material particles, wherein the second portion is located between the current collector and the first portion; and
selectively removing the first portion wherein most parts of the first portion are removed without drying.

17. The method for manufacturing a power storage device, according to claim 16, wherein the active material particles comprises iron and phosphorus and has an olivine structure, and an average of a cube root of a volume of each of the active material particles is 5 nm to 200 nm.

18. The method for manufacturing a power storage device, according to claim 16, wherein a surface of one of the active material particles is coated with carbon.

19. The method for manufacturing a power storage device, according to claim 17, wherein more than or equal to 60% of the active material particles are single crystals.

20. The method for manufacturing a power storage device, according to claim 17, wherein the average of a cube root of a volume of the active material particle is 5 nm to 50 nm.

21. The method for manufacturing a power storage device, according to claim 1, wherein the slurry comprises both of the binder and the electrolyte solution.

22. The method for manufacturing a power storage device, according to claim 6, wherein the slurry comprises both of the binder and the electrolyte solution.

23. The method for manufacturing a power storage device, according to claim 11, wherein the slurry comprises both of the binder and the electrolyte solution.

24. The method for manufacturing a power storage device, according to claim 16, wherein the slurry comprises both of the binder and the electrolyte solution.

* * * * *

UNITED STATES PATENT AND TRADEMARK OFFICE
CERTIFICATE OF CORRECTION

PATENT NO. : 8,865,270 B2  
APPLICATION NO. : 13/339486  
DATED : October 21, 2014  
INVENTOR(S) : Mayumi Mikami et al.

Page 1 of 1

It is certified that error appears in the above-identified patent and that said Letters Patent is hereby corrected as shown below:

In the Specification:

Column 9, line 20, "stored in the, power storage device" should read
--stored in the power storage device--

Column 10, line 51, "or transmitting, a signal" should read --or transmitting a signal--

Column 10, lines 58, "operation Of the power receiving device" should read
--operation of the power receiving device--

In the Claims:

Column 13, line 64, Claim 9, "according to claim 8" should read
--according to claim 7--

Column 14, line 57-58, Claim 20, "the average of a cube root of a volume of the active
material particle is 5 nm to 50 nm" should read
--the average is 5 nm to 50 nm--

Signed and Sealed this
Twenty-eighth Day of April, 2015

Michelle K. Lee
*Director of the United States Patent and Trademark Office*